United States Patent Office 3,619,898
Patented Nov. 16, 1971

3,619,898
MACHINE TOOL
Charles B. Perry and Herman Horlacher, Cincinnati, Ohio, assignors to The Cincinnati Milling Machine Company, Cincinnati, Ohio
Filed Aug. 11, 1969, Ser. No. 849,107
Int. Cl. B23q 3/157
U.S. Cl. 29—568                                   7 Claims

ABSTRACT OF THE DISCLOSURE

This invention relates to a machine tool and, more particularly, to a machining apparatus having tool changing capabilities wherein a double-armed interchanger carries successive tools from a tool storage matrix to a working spindle.

BACKGROUND OF THE INVENTION

It has become common practice to manufacture multipurpose machine tools which are intended to be regulated by numerical control equipment in which not only is the workpiece movement, tool feed and speed and similar machining movement parameters operated from the control apparatus, but a plurality of tools is provided in a storage matrix, which tools are transferred into the spindle under the operation of the control apparatus when needed during the machining sequence. Most of these tool-changer, multiple-function machine tools, however, have the disability that they are quite complicated and expensive. It is desirable to provide such an apparatus that is simple, reliable, and has a moderate price. The apparatus is particularly intended for use where high-speed drilling and other treatment of small holes is necessary in a workpiece. In such a situation, it is desirable that the tools be stored as close to the working spindle as possible, so that the time of transfer is small. When this is done, however, the difficulty arises that the prior art interchangers carry the tools from the tool storage matrix to the spindle in a rather wide arc, which means that care must be made to prevent the tool from striking the mounting column, the workpiece, etc. These and other difficulties experienced with the prior art devices have been obviated in a novel manner by the present invention.

It is, therefore, an outstanding object of the invention to provide a machine tool having a tool changer apparatus which occupies very little space.

Another object of this invention is the provision of a numerically-controlled machine tool having tool changer capabilities wherein the interchanger sweeps the tools through a small volume.

It is another object of the instant invention to provide a tool changer machine tool which is inexpensive to manufacture, is rugged in construction, and which is capable of a long life of useful service with a minimum of maintenance.

A still further object of the invention is the provision of a machine tool in which the tool storage matrix is mounted on the toolhead containing the spindle and in which an interchanger is provided between the matrix and the spindle that is of such a nature that it sweeps through a very small volume.

With these and other objects in view, as will be apparent to those skilled in the art, the invention resides in the combination of parts set forth in the specification and covered by the claims appended hereto.

SUMMARY OF THE INVENTION

In general, the invention has to do with a machine tool having a housing with a rotatable spindle, having a storage matrix for holding a plurality of tools mounted in tool holders and presenting them one at a time to a position in which they extend substantially at a right angle to the spindle axis, and having an interchanger for exchanging a tool attached to the spindle for another tool from the said position. The interchanger includes a main body to which are attached two arms located on opposite sides of the plane in which the spindle and the said position lie and are swingable about an axis extending at a right angle to the said plane and located between the spindle and the said position.

Each arm is rotatable about an axis passing through its length and the arms swing in opposite directions about the axis, one to carry a tool from the spindle to the position, and the other to carry a tool holder from the position to the spindle. Each tool twists during the swinging motion to introduce the proper end of the tool holder to the spindle and to the position.

BRIEF DESCRIPTION OF THE DRAWINGS

The character of the invention, however, may be best understood by reference to one of its structural forms, as illustrated by the accompanying drawings, in which:

FIG. 7 is a view of the apparatus taken on the line VII—VII of FIG. 6, while

DESCRIPTION OF THE PREFERRED EMBODIMENT

Figure 1:
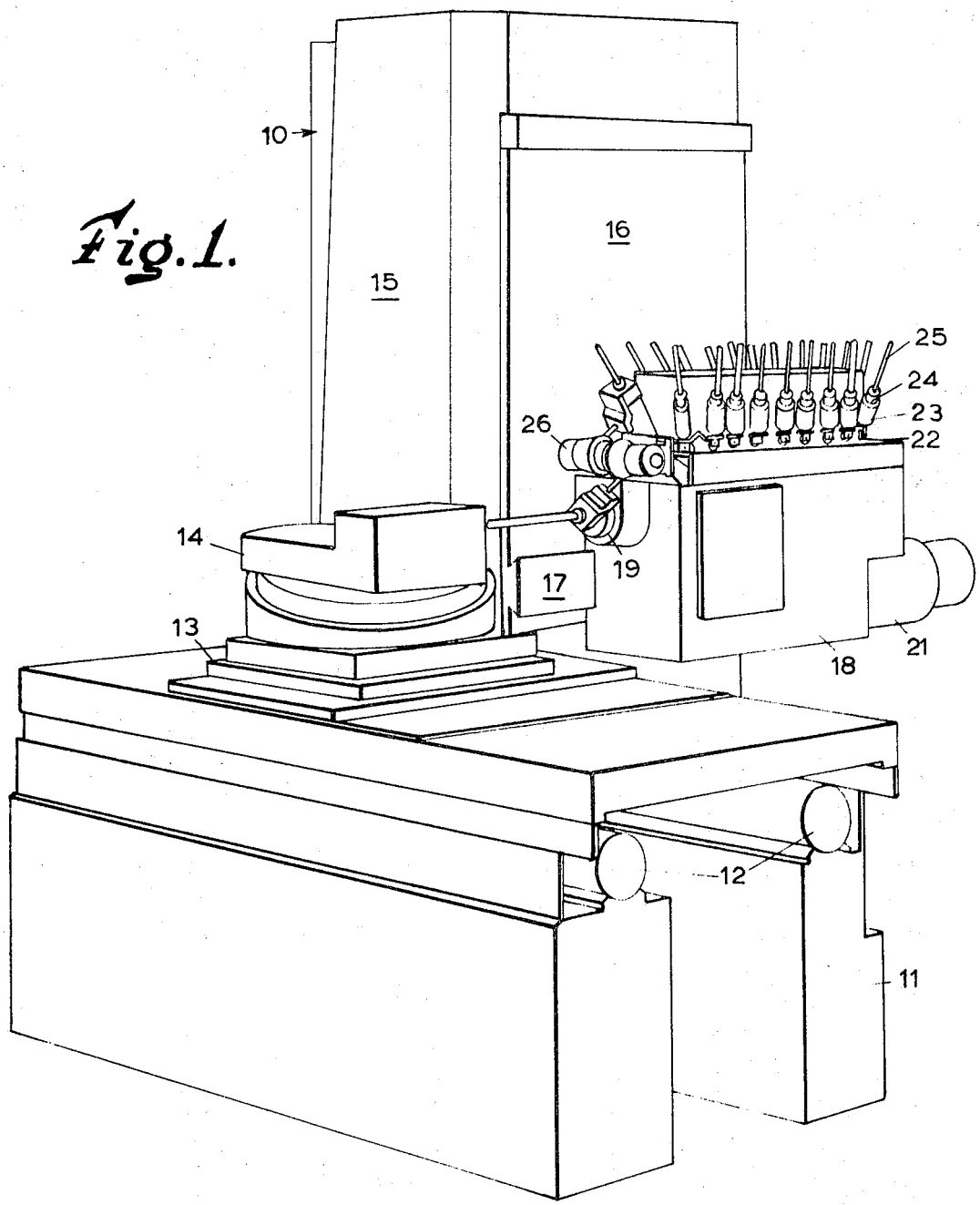
FIG. 1 is a perspective view of a machine tool embodying the principles of the present invention.

Referring first to FIG. 1, wherein are best shown the general features of the invention, the machine tool, indicated generally by the reference numeral 10, is shown as having a base 11 on which are mounted parallel ways 12. These ways serve to support and guide for X-axis motion a work table 13 on which is mounted a workpiece 14 on which a variety of machining operations are to be performed. In general, however, these operations will be drilling, boring, tapping, counter-boring, and the like of holes of small diameter with possibly some high-speed, small-volume milling.

Extending upwardly from the base 11 is a column 15 having vertical ways (not shown) on which are slidably mounted for Y-axis motion a table 16. The table is provided with horizontal ways 17 on which is mounted a toolhead 18. The toolhead is capable of movement along the ways in the Z-axis direction and is provided with a spindle 19 rotatably driven by a motor 21. Mounted on the horizontal upper surface of the toolhead 18 is a tool storage matrix 22 provided with a plurality of sockets 23 in which are mounted tool holders 24 which, in turn, carry tools 25. It will be understood that, although the tools 25 may vary considerably in their shank dimensions and shapes, the tool holders 24 are formed in such a way that their outer surfaces, which engage the sockets 23, are the same, so that any tool holder can fit in any socket. Also mounted on an upper horizontal surface of the toolhead 18 is an interchanger 26 for transferring tool holders 24 with their tools 25 from the rack 22 to the spindle 19 and vice versa.

Figure 2:
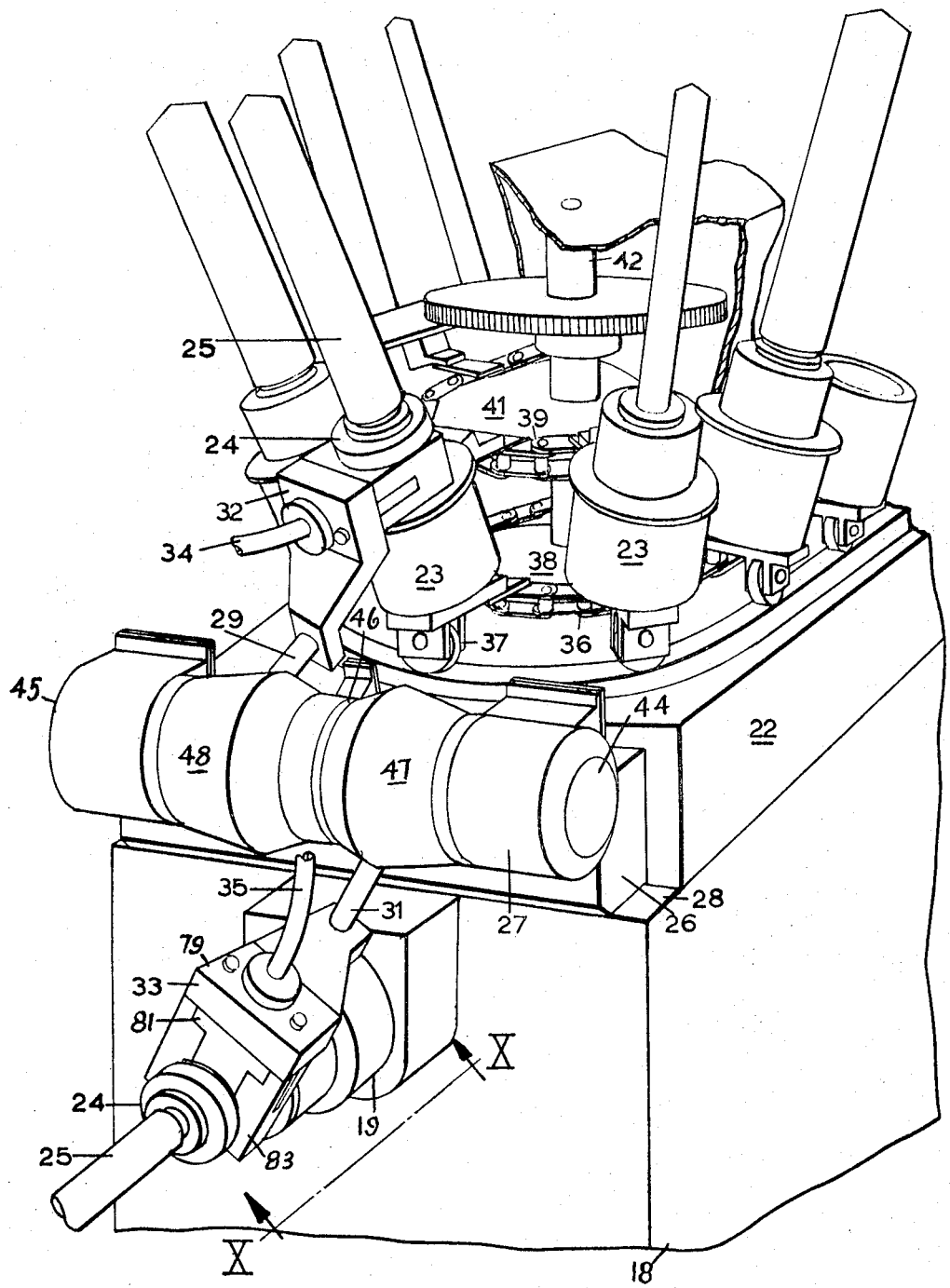
FIG. 2 is an enlarged perspective view of a portion of the machine tool.

In FIG. 2 it can be seen that the interchanger 26 is provided with a main body 27 which is bolted to a front vertical surface of the base of the storage matrix 22 and rests on an upper horizontal surface 28 of the toolhead 18. Extending from the left-hand side of the body 27 is a left arm 29 which is shown as operative at the tool storage matrix 22 and a right arm 31 which lies adjacent the spindle 19. The outer end of the arm 29 is provided with a head 32 which is clamped on a tool holder 24 having a tool 25. In a similar manner, the right arm 31 has a head 33 which lies adjacent a tool holder 24 and its tool 25 but, if the spindle 19 is operative to rotate the tool holder and tool, the head 33 will not be clamped to it but will simply lie adjacent to it. The hydraulic pressure conduit 34 enters the head 32, while a similar conduit 35 enters the head 33.

FIG. 2 shows particularly well the construction of the tool storage matrix 22. The lower endless chain 36 has attached to it a series of wheeled carts 37 to which the sockets 23 are attached. The chain 36 lies in a horizontal plane, is driven by a sprocket 38 at the end adjacent the interchanger 26, and rides around an idler sprocket (not shown) at the other end. The upper portions of the sockets 23 are attached to a similar chain 39 which is driven by a sprocket 41. Both sprockets 38 and 41 are mounted on a driven vertical shaft 42. As is obvious from the drawings, the sockets 23 are tilted outwardly, so that, when they arrive at the interchange position closest adjacent the interchanger 26, the axis of the tool 25 and of the tool holder 24 lies at an angle of about 30° out of the vertical toward the tool changer.

Figure 3:
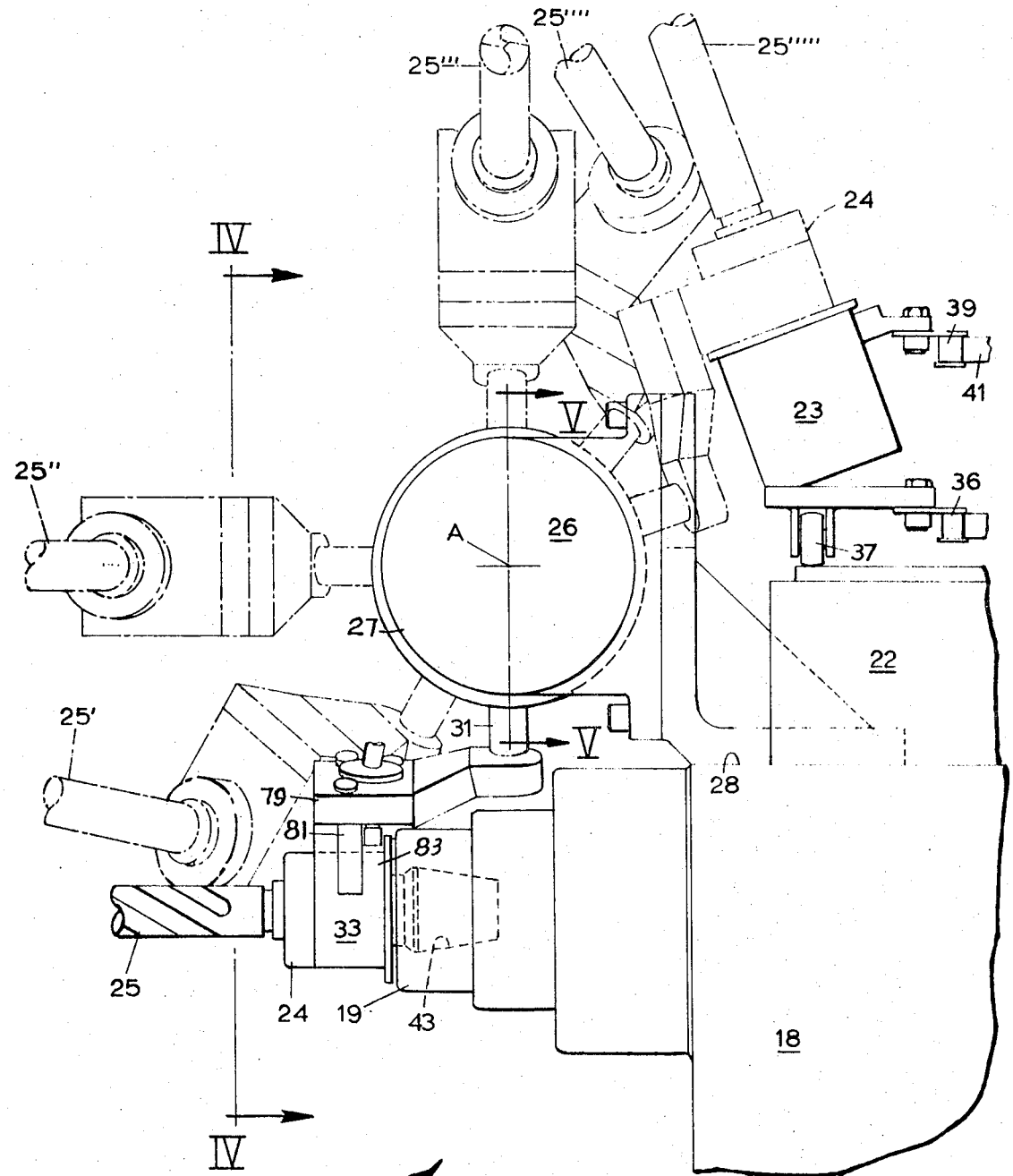
FIG. 3 is an end view of the apparatus shown in FIG. 2 showing the manner in which it operates.

FIG. 3 gives a general showing of how the interchanger 26 operates, so that it will be easier to understand the detailed description of the mechanism which is to follow. This figure shows the various motions of the right arm 31 as it carries the tool into an empty socket 23 on the tool storage matrix 22. In this view, it is clear that the spindle 19 is provided with a socket 43 in which is locked a similarly-shaped base of the tool holder 24 during the machining operation. During that time, the head 33 does not clamp the tool holder, but simply remains in position with a slight clearance between the tool holder body and head 33. When the machining operation is over, the head 33 clamps the tool body and the arm 31 swings about a main axis A of the interchanger. This axis extends at a right angle to a plane which joins the interchanging position on the rack 22 with the axis of the spindle 19 and generally lies midway between them. As the arm 31 rotates clockwise about the axis A, the arm also twists about its own length on an axis which passes at a substantial angle to the axis A—A. The twisting of the arm 31 takes place so that the tool begins to turn toward the observer (who is standing at the right-hand side of the interchanger) and the position is indicated by 25'. By the time the arm has rotated about 90° about the axis A—A, it has twisted to the point where the toolhead has also been twisted about 90°, as indicated at 25''. Another 90° of arm rotation about the axis A and the tool in the tool holder is still directed toward the observer, as shown at 25'''. After it passes this position, however, the arm begins to twist back in the other direction, as shown at 25'''', and finally, the arm is twisted around so that the axis of the tool holder at 25''''' and the tool holder 24 are exactly in line with the axis of the socket 23 at the interchanging position in the rack 22.

Figure 4:
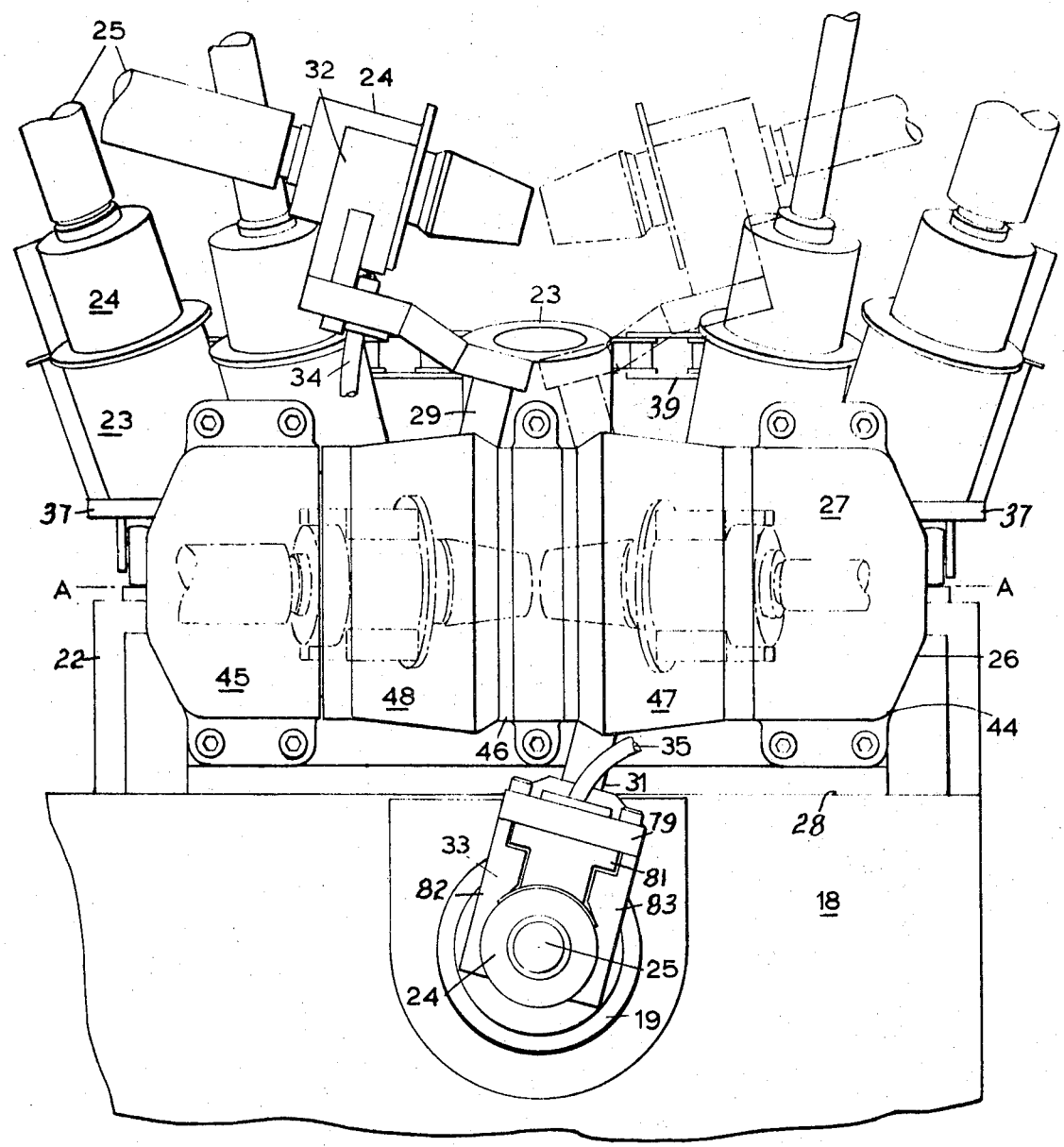
FIG. 4 is a front elevational view of the apparatus.

Turning now to FIG. 4, it can be seen that the main body 27 of the interchanger 26 has a generally cylindrical configuration about the axis A—A and consists of two fixed end housings 44 and 45 and a fixed central housing 46. Between the central housing 46 and the right-hand end housing 44 is a rotatable housing 47, while a similar rotatable housing 48 lies between the central housing 46 and the left-hand end housing 45. The left arm 29 extends from the rotatable housing 48, while the right arm 31 extends from the rotatable housing 47. It can be observed that, in the central portion of the interchanger, the two arms with their tool holders and tools are passing one another as they move in opposite directions, one arm carrying a tool toward the spindle 19 and the other arm carrying a tool holder and tool toward the interchange position where any empty socket 23 awaits it. In this passing position, the tools are directed in opposite directions toward the ends of the main body 27.

Figure 5:
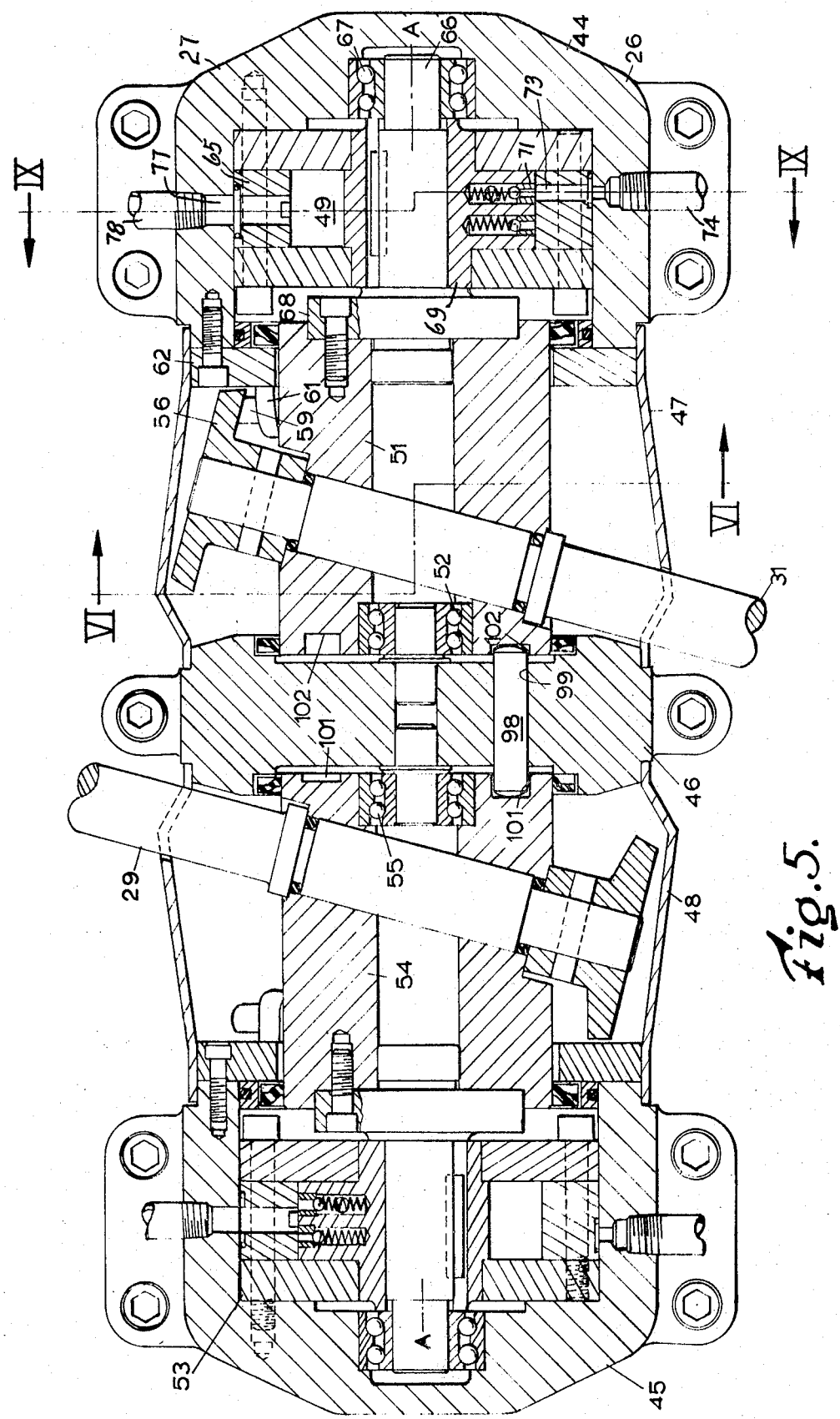
FIG. 5 is a sectional view of the apparatus taken on the line V—V of FIG. 3.

FIG. 5 shows the internal construction of the interchanger 26 quite well. The end housing 44 carries a vane-type hydraulic rotary motor 49 to which is bolted a tube 51 through which the arm 31 extends at a substantial angle to the axis A—A. The end of the tube opposite the motor 49 is carried in bearings 52 on the central housing 46. In a similar way, the end housing 45 is also provided with a vane-type hydraulic motor 53 to which is bolted an axial tube 54 through which the arm 29 extends. The inner end of the tube 54 is supported on bearings 55 which are mounted on the central housing 46. It can be seen that the rotatable housings 47 and 48 are simply guards which protect the interior of the interchanger, but perform no mechanical function in connection with the arm. They do, however, rotate with the arm. When the arms 29 and 31 lie in the same plane, as they do in FIG. 5, it can be seen that they are parallel to one another and lie at substantial angles to the axis A—A of the interchanger.

Figure 7:
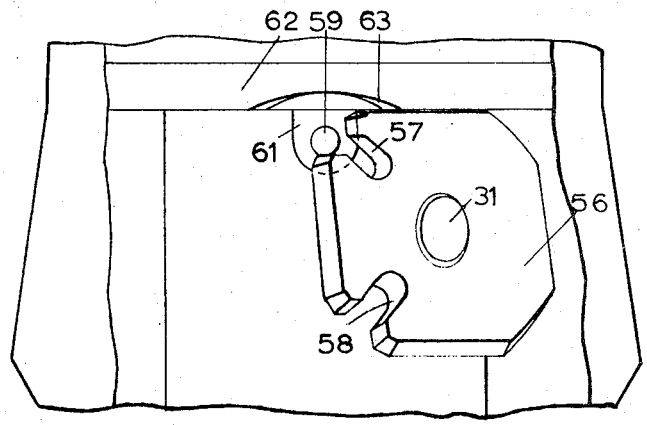
Figure 8:
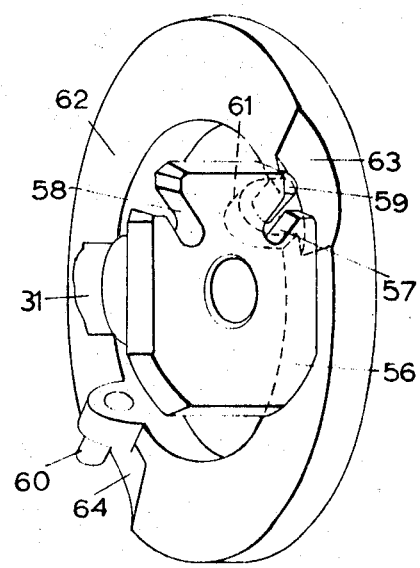
FIG. 8 is a perspective view of the apparatus shown in FIG. 6 presented for clarity of understanding.
Figure 6:
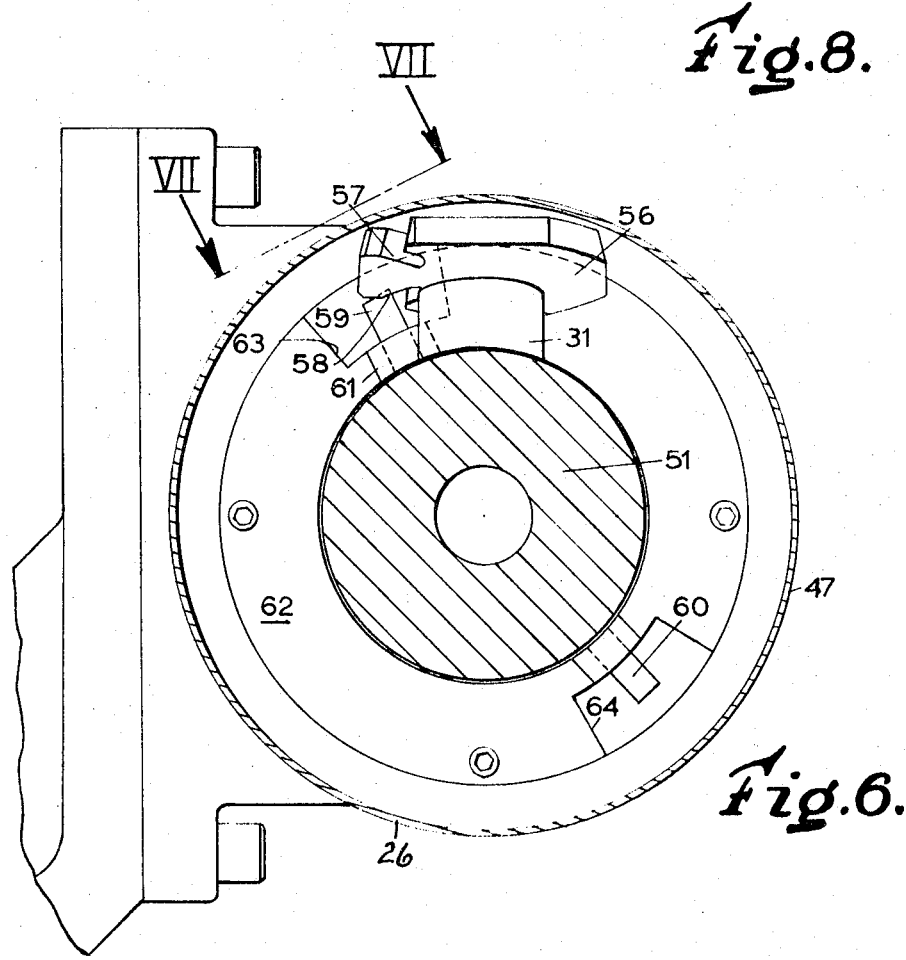
FIG. 6 is a sectional view of the apparatus taken on the line VI—VI of FIG. 5.

As shown in FIGS. 6, 7, and 8, the ends of the arms which lie inside of the main body are provided with a Geneva mechanism. For instance, the inner end of the arm 31 is connected to a head 56 which has a generally square configuration with deep notches or slots 57 and 58 at adjacent corners. These slots are in a position to be engaged by a radial peg 59 which extends from a protuberance 61 formed on a fixed end plate 62 forming part of the end housing 44. A similar peg 60 is mounted on the end plate 62 almost diametrically opposite the peg 59, as is evident in FIGS. 6 and 8. Adjacent the peg 59, the end plate 62 is provided with a recess 63, while a similar recess 64 is formed in the end plate beside the peg 60. Generally speaking, what this mechanism accomplishes is the turning of the arm 31 about its axis as it is also being rotated about the axis A—A by the rotation of the ring 51. A similar mechanism is associated with the arm 29 to cause it to twist in its movement about the main axis A—A.

Figure 9:
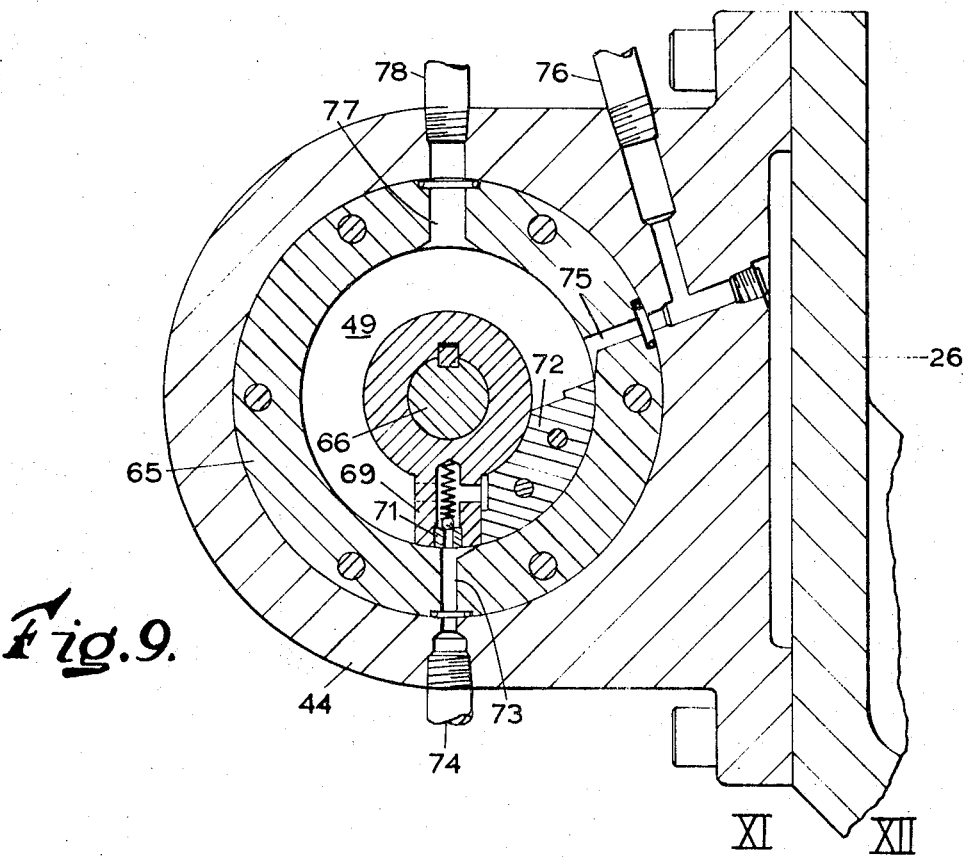
FIG. 9 is a sectional view of the apparatus taken on the line IX—IX of FIG. 5.

FIG. 9 shows the manner in which the vane-type motor 49 is constructed. The end housing 44 has a ring 65 mounted in it. Centrally of this ring coaxial with the axis A—A is a shaft 66 which is mounted at one end in a bearing 67 and at the other end is provided with a flange 68 by which it is bolted to the tube 51 which, it will be recalled, is mounted in a bearing 52. Keyed to the shaft 66 is a vane 69 whose outer edge has a spring-biased blade 71 engaging the inner cylindrical surface of the ring 65. Also, bolted to the inner surface of the ring 65 is a block 72 which remains fixed to the ring while the vane 69 moves from one side of the block to the other in rotating as part of the motor. Through the housing 44 and the ring 65 extends a passage 73 which is served by a conduit 74. This passage emerges into the interior of the ring 65 adjacent one side of the block 72. A similar passage 75 served by a conduit 76 emerges into the interior of the ring 65 adjacent the other side of the block 72. Finally, an intermediate passage 77 served by a conduit 78 enters the interior of the motor at an intermediate position which is considerably closer to the passage 75 than to the passage 73; i.e., it is diametrically opposite the passage 73.

Figures 10, 11, 12:
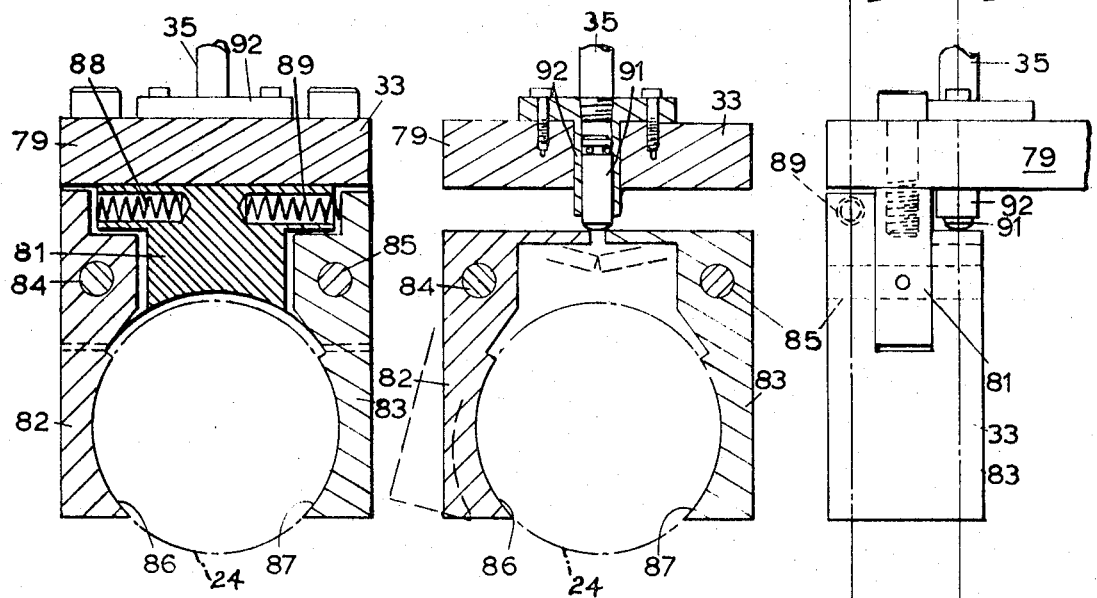
FIG. 10 is a side view of a tool clamping apparatus as observed along the line X—X of FIG. 2.
FIG. 11 is a sectional view taken on the line XI—XI of FIG. 10.
FIG. 12 is another sectional view of the clamping apparatus taken on the line XII—XII of FIG. 10.

FIGS. 10, 11, and 12 show the manner in which the head 33 mounted on the arm 31 is constructed. Basically, it is provided with a plate 79 to which is bolted a flange 81. To this flange are swingably attached clamping fingers 82 and 83 by means of hinge pins 84 and 85, respectively. These fingers are provided with inwardly-directed cylindrical surfaces 86 and 87 adapted to embrace correspondingly-shaped surfaces on each of the tool holders 24. The fingers 82 and 83 are biased inwardly to clamping position by springs 88 and 89 which are mounted in bores in the flange 81 and extend outwardly to press against suitable end surfaces of the fingers, as shown in FIG. 11. This spring pressure can be overcome by a small piston 91 which is slidably mounted in a suitable cylinder 92 in the plate 79 and provided with pressure fluid, on occasion, through the conduit 35.

Figure 13:
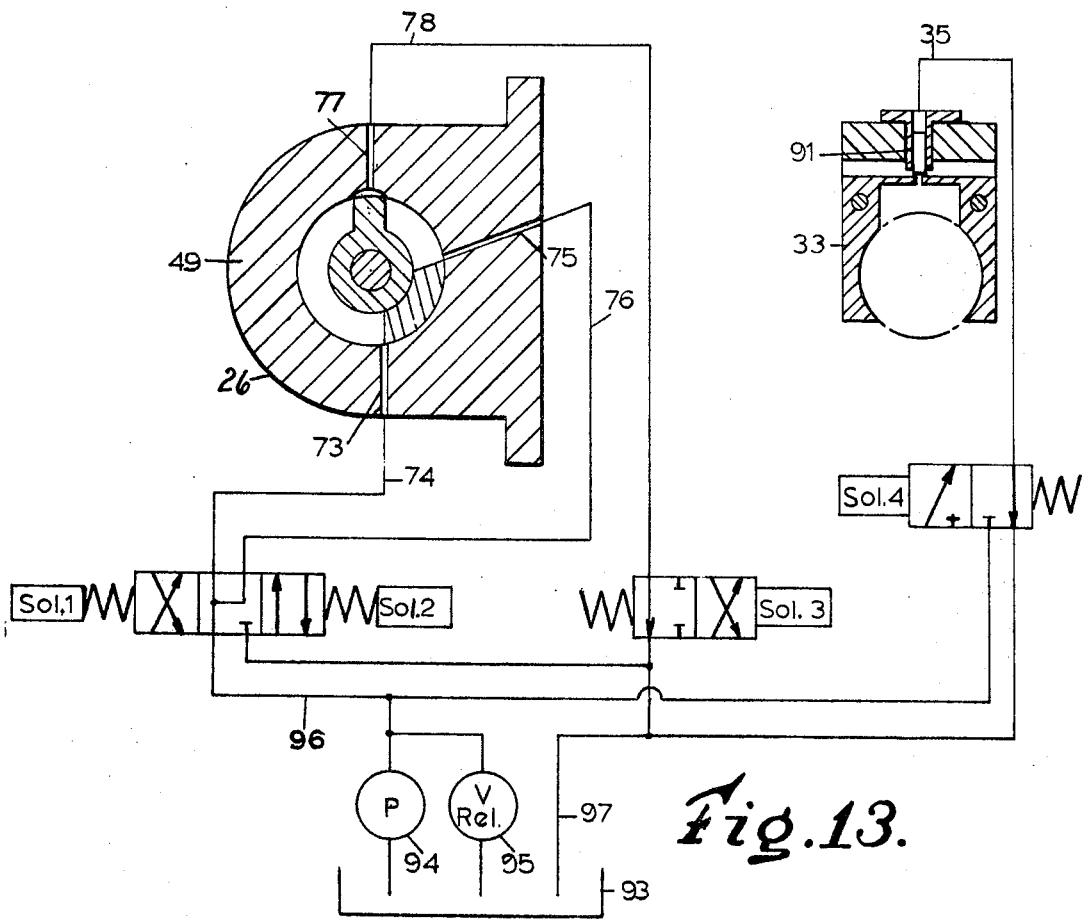
FIG. 13 is a schematic hydraulic diagram of the operating elements of the machine tool.

FIG. 13 shows the hydraulic interconnections associated with the apparatus. A motor 49 and the clamping head 33 are shown somewhat schematically and are associated with a pump 94 and a pressure regulating valve 95 which discharge pressure fluid into a conduit 96. A drain line 97 returns pressure oil from the system to a sump 93. Also connected into the system are solenoid valves Sol. 1, Sol. 2, Sol. 3, and Sol 4. The solenoid valve Sol. 4 connects the conduit 35 leading to the piston 91 of the clamping head either to the pressure line 96 or to the drain line 97 on suitable occasions. The solenoid valves Sol. 1 and Sol 2 serve to connect the conduits 74 and 76, which serve the passages 73 and 75, respectively, of the motor 49, alternately to the pressure line 96 and the drain line 97. The solenoid valve Sol. 3 serves only to connect the conduit 78 associated with the passage 77 to the drain line 97, on occasion. It is assumed that the hydraulic system would be connected to the clamping head 32 in the same manner as is shown for the clamping head 33, and to the motor 53 in the same manner as the motor 49.

Figure 14:
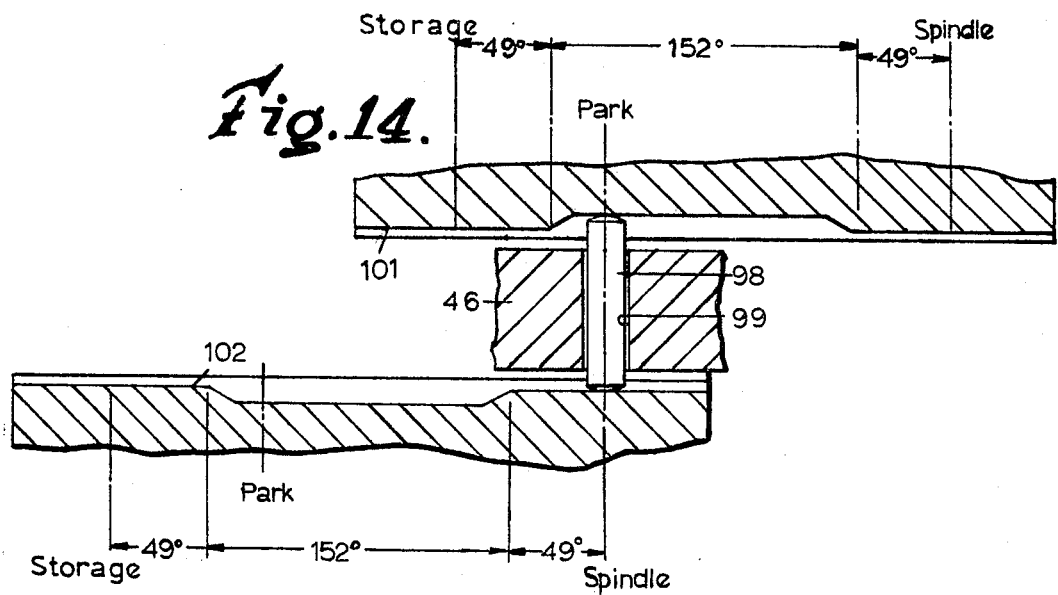
FIG. 14 is a somewhat schematic view showing the cam arrangement for controlling the motion of the interchanger parts.

FIG. 14 shows the relationship set up, as is best evident in FIG. 5, by a pin 98 which is slidably mounted in a bore 99 extending entirely through the center housing 46 with its axis parallel but spaced from the axis A—A of the interchanger. The ends of this pin extend into cam grooves 101 and 102 formed in the radial end surfaces of the tubes 54 and 51, respectively. These grooves are both annular and extend entirely around the rings concentric to the axis A—A. They are formed with cam-like surfaces which face toward the ends of the pin 98, these surfaces being shown in FIG. 14. This causes the tubes 51 and 54 to move axially during different parts of the cycle of rotation, since the pin 98 stays fixed with its central housing 46, while the tubes rotate with their arms 31 and 29. This serves the effect of engaging and dis-engaging the notches of the heads, such as the head 56 associated with the arm 31, from the pegs while the arms are in PARK position.

The operation of the apparatus will now be readily understood, in view of the above description. As the rings 51 and 54 are rotated by their respective motors 49 and 53, the arms 31 and 29 are rotated also about the axis A—A. At the same time, the heads on the inner ends of the arms are taking part in a Geneva movement that rotates the arms about their longitudinal axes. For instance, the notches 57 and 58 on the head 56 of the arm 31 engage first the peg 59 at one end of the swing and the peg 62 at the other end of the swing. This has the result of twisting the arm 90°, as was shown in FIG. 3 in connection with the description of the motion of the arm 31. At the same time, in certain parts of the cycle, the arm is freed from this rotation by the action of the pin 98 in the cam grooves 101 and 102. Furthermore, during the cycle, the clamping heads associated with the arms are clamped and unclamped on the tool holders associated with the tools that are involved in this cycle. It will be understood, of course, that the arm which has just returned the used tool to the empty socket of the tool rack will move back out into a "PARK" position until the rack has been moved around to the point where the next tool to be presented to the spindle arrives at the interchange position. Then the arm will move back down again toward the socket to pick up the new tool holder and tool.

It can be seen that the present equipment is capable of changing tools considerably faster than is normally the case in connection with machine tools having tool changing capabilities. In a practical embodiment of this invention, a complete tool change cycle (metal-to-metal) appeared to be attainable in about two seconds. The invention is suitable for a wide range of applications. The operating principle, in general, is to insert and remove tapered shank tool holders from the machine spindle by means of arms pivoting on a short radius and, in addition, imparting a twisting motion around the axis of the arms. With two such arms mounted on a common housing that may be attached to the face, top, or sides of a spindle housing assembly, the twisting motion imparted by the arms performs three functions:

(1) It reduces the intrusion of the tool tip into the work zone, (2) It permits the tools in each arm to pass one another while close to the spindle by orienting the tapers so that they point toward each other, and (3) It permits the tool holders to be delivered to a pocket in the storage matrix with the taper preceding. The tool holders are "slapped" into the spindle nose or into the storage pocket by a swinging motion rather than the conventional method of a lateral movement coaxial with the spindle axis.

The principal advantages of this arrangement are that it results in a major reduction in spindle travel required for tool change in a very fast tool exchange, in a universality of design permitting its use on a variety of machine types and configurations, in simplicity and associated low manufacturing cost, and in adaptability to a wide range of tool storage systems. It can be seen, then, that another advantage of the present invention is that the entire tool changing and tool storage mechanisms become elements that can be practically added on to and efficiently incorporated into a wide variety of machine types, sizes, and configurations.

A major objective of the present invention was to find an efficient means for changing relatively small diameter tools which have proved to be the major mission of tool changing systems. Studies of a great variety of workpieces which have been felt to be typical of machine parts suitable for tool changing manufacturing methods indicate that a very high percentage of the cutting tools required are of small diameter (less than one inch). It was felt that, if a tool changing and tool storage concept were developed that would accommodate this domain by cutters very efficiently, it would be useful not only as a specialized high-speed spindle on machining centers but also on vertical spindle drill presses, horizontal spindle hole-making machines, and the like. When the invention is used with the small diameter tools, the functional requirements of the spindle, tool holder, tool changing system, and tool storage system are quite different from those required when one is working with larger diameter milling cutters and boring tools. The small cutters must be turned at high speed and it is highly desirable to have a small diameter spindle mounted in a light carrier capable of being positioned at a high traverse rate. Since these small diameter tools are usually used with a much higher frequency than the large diameter tools, it is appropriate to emphasize high speed in the interchanging of the tools in the spindle.

An advantage of considerable significance is that the storage requirements for the small diameter tools are very different from the large heavy tools. Since the diameters are small, the tool storage system can accommodate a large number of tools in a relatively small space. This, in turn, is compatible with storing the tools close to the spindle and permitting the interchange arms to remove and deliver tools directly. This, in turn, is compatible with a storage matrix on top or mounted on the side of the spindle housing assembly. The concept of the present swing-twist tool changing system permits tools to be picked up and delivered to a single storage pocket location in the storage matrix. The design of the storage system can be extremely simple, as shown in the present specification and drawings, in the case of vertically-oriented pockets. The tapered end of the tool holder is delivered by the interchanger arms into the pocket. Then it is released and the arm swings away. No mechanical locking or retention means is required.

A major performance advantage of the present system is its ability to position the next tool to be used while the tool in the spindle is productively engaged. This is accomplished by means of the second arm which returns the used tool to storage and picks up the next to be used tool while the spindle is making use of the present tool.

The ability of the swing-twist principle of the present invention to minimize the intrusion of the tool tip into the work zone has advantages over and above the reduction of total tool change time cycle in that it permits the total excursion of the Z-axis to be reduced by the difference in travel required to extract the straight shank tool as opposed to extracting the tapered shank tool of the present invention. This reduction in Z-axis excursion will always contribute to lower manufacturing costs and in some configurations, will substantially contribute to improved radial stiffness of the spindle in relation to the work support surface.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising:

(a) a housing having a rotatable spindle,
(b) a storage matrix spaced from the spindle for holding a plurality of tools and presenting them one at a time to a position in which they extend substantially at a right angle to the spindle axis and
(c) an interchanger located between the storage matrix and the spindle for exchanging a tool attached to the spindle for another tool from the said position, the interchanger including a main body to which are attached two arms located on opposite sides of the plane in which the spindle and the said position lie and swingable about a main axis extending at a right angle to the said plane and located between the spindle and the said position, each arm being rotatable about an axis passing through its length.

2. A machine tool as recited in claim 1, wherein the arms swing in opposite directions about the axis, one to carry a tool from the spindle to the position and the other to carry a tool from the position to the spindle.

3. A machine tool as recited in claim 2, wherein each arm twists during the swinging motion to introduce the proper end of the tool to the spindle and to the position.

4. A machine tool as recited in claim 3, wherein the arms extend at a substantial angle to the swing axis and the swinging motion takes place simultaneously so that the arms pass one another going in the opposite direction.

5. A machine tool as recited in claim 4, wherein the arms are twisted during the swinging in a direction such that when the arms pass one another the tools on the arms are directed away from one another and do not strike.

6. A machine tool as recited in claim 1, wherein the tool is delivered to the said position with the same orientation irrespective of which arm carries it there.

7. A machine tool as recited in claim 1, wherein each arm is swingable independently of the other by a hydraulic rotary motor which is coaxial of the said axis.

References Cited
UNITED STATES PATENTS

| | | | |
|---|---|---|---|
| 3,327,386 | 6/1967 | Jerue | 29—568 |
| 3,492,717 | 2/1970 | Seidel et al. | 29—568 |
| 3,524,248 | 8/1970 | Durr et al. | 29—568 |

WILLIAM S. LAWSON, Primary Examiner

Z. R. BILINSKY, Assistant Examiner